(12) United States Patent
Iwane

(10) Patent No.: US 7,847,226 B2
(45) Date of Patent: Dec. 7, 2010

(54) FOCUS DETECTION DEVICE AND METHOD WITH HONEYCOMB LENS ARRAY AND IMAGING DEVICE

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/076,835

(22) Filed: Mar. 24, 2008

(65) Prior Publication Data

US 2008/0237444 A1 Oct. 2, 2008

(30) Foreign Application Priority Data

Mar. 28, 2007 (JP) ............................. 2007-084031

(51) Int. Cl.
*G02B 7/04* (2006.01)
*G02B 27/40* (2006.01)
*G02B 27/64* (2006.01)

(52) U.S. Cl. ................. 250/201.2; 250/208.1; 250/216; 257/432

(58) Field of Classification Search .............. 250/201.1, 250/201.2, 201.4, 216, 208.1; 257/432
See application file for complete search history.

(56) References Cited

U.S. PATENT DOCUMENTS

| 4,373,791 A | | 2/1983 | Araki | |
|---|---|---|---|---|
| 4,831,272 A | * | 5/1989 | Imai | ............................ 250/548 |
| 5,109,158 A | * | 4/1992 | Horne | ........................ 250/332 |
| 5,864,721 A | * | 1/1999 | Suda et al. | ................... 396/114 |
| 5,917,544 A | * | 6/1999 | Sobotta et al. | ........... 348/222.1 |
| 2004/0155976 A1 | * | 8/2004 | Suda | ........................... 348/345 |
| 2004/0263977 A1 | * | 12/2004 | Toyoda et al. | ............... 359/558 |
| 2005/0226609 A1 | * | 10/2005 | Suda | ........................... 396/114 |
| 2006/0087572 A1 | | 4/2006 | Schroeder | |
| 2007/0025716 A1 | * | 2/2007 | Ichimiya | ..................... 396/147 |

FOREIGN PATENT DOCUMENTS

| GB | 2 240 444 A | 7/1991 |
|---|---|---|
| JP | A-55-115020 | 9/1980 |
| JP | A-4-345279 | 12/1992 |
| JP | A-2007-112856 | 5/2007 |
| WO | WO 2005/114297 A2 | 12/2005 |

OTHER PUBLICATIONS

Michael Lampton, "The Microchannel Image Intensifier," *Scientific American*, Nov. 1981, pp. 46-55.
Frank et al., "High -speed Industrial Color and Position Sensors", [*SPIE*,] vol. 3649, Jan. 1999, San Jose, California, pp. 50-57.

* cited by examiner

*Primary Examiner*—Thanh X Luu
*Assistant Examiner*—Francis M Legasse, Jr.
(74) *Attorney, Agent, or Firm*—Oliff & Berridge, PLC

(57) ABSTRACT

A light detection device includes a lens array of a plurality of lenses arranged in the form of a honeycomb; and a photoelectric device array of a plurality of photoelectric devices for each of the plurality of lenses. The plurality of photoelectric devices is arranged under each of the plurality of lenses. Also disclosed are a focus detection device provided with the light detection device, and an imaging apparatus provided with the focus detection device as well as a method of producing such a light detection device and a method of detecting a focus.

3 Claims, 11 Drawing Sheets

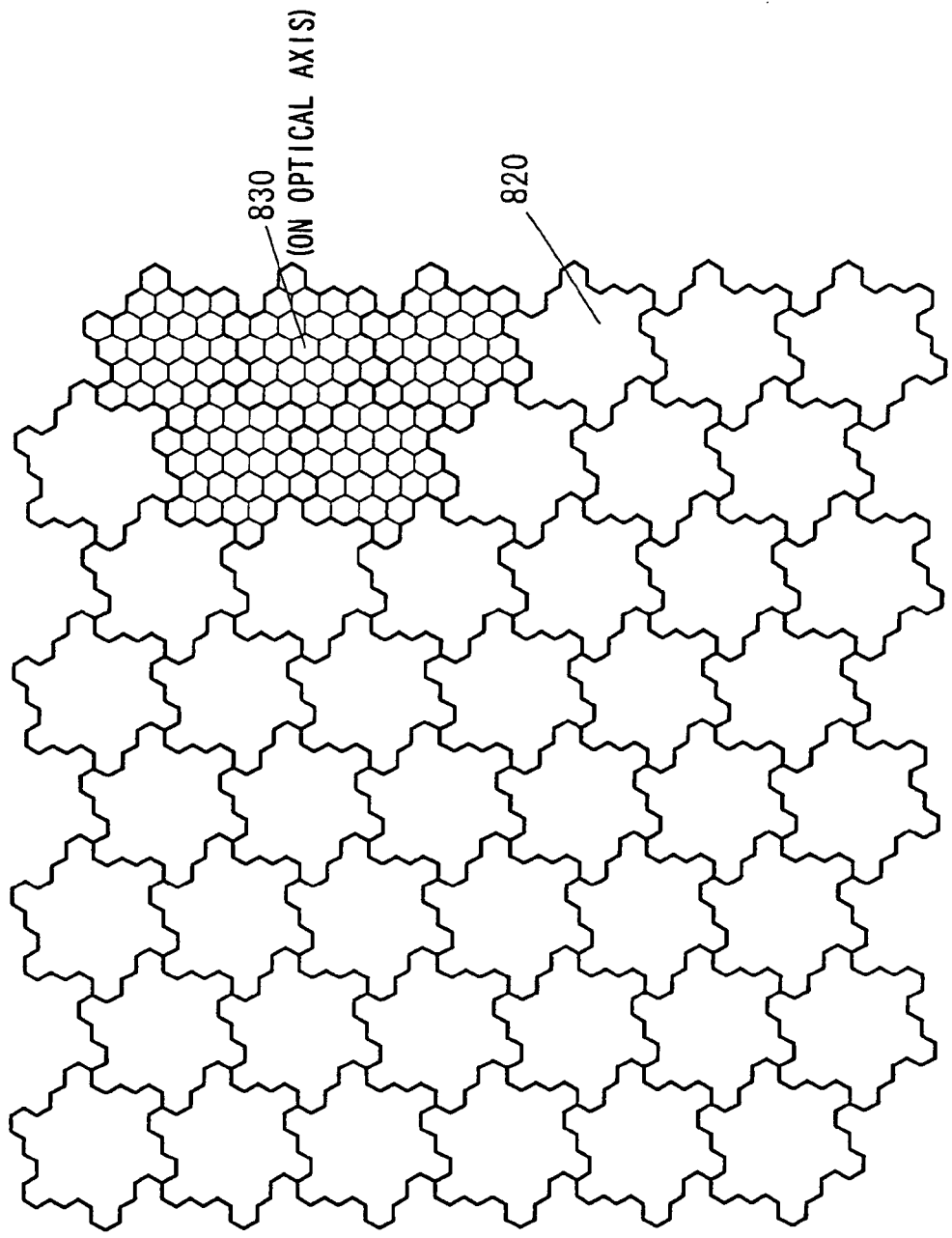

FIG. 10B

HORIZONTAL AND VERTICAL DISTANCES BETWEEN CENTRAL POINTS OF TWO ADJACENT HEXAGONS

| HORIZONTAL DISTANCE (d1) | VERTICAL DISTANCE (d2) | RATIO OF VERTICAL DISTANCE TO HORIZONTAL DISTANCE (d2/d1) | CENTRAL ANGLE OF ONE SIDE (°) |
|---|---|---|---|
| (*) 1 | √3 (ca. 1.73205) | √3 (ca. 1.73205) | 60 |
| 3 | 5 | 1.67 | 56.5 |
| 4 | 7 | 1.75 | 61.0 |
| 5 | 9 | 1.80 | 64.1 |
| 7 | 12 | 1.71 | 58.8 |
| 9 | 16 | 1.78 | 62.7 |
| 10 | 17 | 1.70 | 58.2 |
| 11 | 19 | 1.72 | 59.7 |
| 12 | 21 | 1.75 | 61.0 |
| 13 | 22 | 1.69 | 57.8 |
| 15 | 26 | 1.73 | 60.1 |
| 17 | 29 | 1.70 | 58.5 |
| 18 | 31 | 1.72 | 59.44 |

NOTE: 1) THE TOP ROW (*) RELATES TO ORTHOHEXAGON.
2) MULTIPLE NUMBER FAMILIES ARE OMITTED.

FOCUS DETECTION DEVICE AND METHOD WITH HONEYCOMB LENS ARRAY AND IMAGING DEVICE

INCORPORATION BY REFERENCE

The disclosure of the following priority application is herein incorporated by reference:

Japanese Patent Application No. 2007-084031 (filed Mar. 28, 2007).

The disclosures of the following publications are herein incorporated by reference:

Michael Lampton, "The Microchannel Image Intensifier", Scientific American, November 1981, pp. 46-55; and Japanese Patent Laid-open Application No. 2007-112856.

BACKGROUND OF THE INVENTION

1. Field of the Invention

The present invention relates to a light detection device including a lens array and a photoelectric device array and a focus detection device provided with the light detection device, and an imaging apparatus provided with the focus detection device. Further, the invention relates to a method of producing such a light detection device and a method of detecting a focus.

2. Description of Related Art

Conventionally, there has been known a focus detection device in which imaging light that comes out of an exit pupil of an objective lens is split through a group of microlenses and the split beams are incident into a pair of photoelectric devices to detect a state of focusing, i.e., a so-called TCL (Through Camera Lens) focus detection device (see, for example, Japanese Laid-open Patent Application No. S55-115020 corresponding to U.S. Pat. No. 4,373,791). In the conventional focus detection device, a pair of photoelectric devices is provided for each microlens such that a combination of the pair of photoelectric devices and the associated microlens as a unit is repeatedly arranged to form a plurality of rows.

On the other hand, there are known techniques for providing micro honeycomb structures as disclosed in, for example, Japanese Patent Laid-open Application No. 2007-112856 and Michael Lampton, "The Microchannel Image Intensifier", Scientific American, November 1981, pp. 46-55.

SUMMARY OF THE INVENTION

However, the group of microlenses arranged on a predetermined focusing plane is not distributed so as to cover all over the predetermined focusing plane but there is therein a region that is not optically used. For this reason, there may be present image information that reaches no photoelectric devices, so that there is a possibility that focus detection will become unstable or erroneous detection of a focused state will occur.

According to a first aspect, the present invention provides a light detection device including: a lens array including a plurality of lenses arranged in the form of a honeycomb; and a photoelectric device array including a plurality of photoelectric devices for each of the plurality of lenses. In this case, the plurality of photoelectric devices is arranged under each of the plurality of lenses.

According to a second aspect, in the light detection device according to the first aspect, the plurality of photoelectric devices may be arranged under each of the plurality of lenses in the form of a honeycomb.

According to a third aspect, in the light detection device according to the first aspect, the lenses may be each in the form of an orthohexagon.

According to a fourth aspect, in the light detection device according to the second aspect, the photoelectric devices may be each in the form of an orthohexagon.

According to a fifth aspect, in the light detection device according to the fourth embodiment, a length of a longest diagonal line segment of each of the plurality of lenses may be an integral multiple of a length of a longest diagonal line segment of each of the plurality of photoelectric devices.

According to a sixth aspect, in the light detection device according to the fourth aspect, a length of a longest diagonal line segment of each of the plurality of lenses may be an integral multiple of a distance between a pair of opposite sides of each of the plurality of photoelectric devices.

According to a seventh aspect, in the light detection device according to any one of the first to fourth aspects, one of the plurality of photoelectric devices under each of the plurality of lenses may be arranged such that an optical axis of the lens under which the photoelectric devices are positioned passes the one of the plurality of photoelectric devices.

According to an eighth aspect, the present invention provides a focus detection device including: a light detection device according to any one of the first aspect to the fifth aspect. In this case, the light detection device may detect a state of focus adjustment of an imaging optical system based upon an output signal of the photoelectric device array.

According to a ninth aspect, in the focus detection device according to the eighth aspect, the lens array may be arranged at a plane other than a predetermined focal plane of the imaging optical system.

According to a tenth aspect, in the focus detection device according to the eighth aspect, the lenses may be each in the form of an orthohexagon, the lens array may be arranged such that sides of any adjacent orthohexagonal lenses contact each other, and the focus detection device may further include a focus adjustment state detection unit including a processor that selects a pair of photoelectric devices located along a base line that connects centers of the plurality of lenses from among the plurality of photoelectric devices corresponding to each of the plurality of lenses, and detects a focus adjustment state of the imaging optical system based on signals obtained from the pair of selected photoelectric devices.

According to an eleventh aspect, in the focus detection device according to the eighth aspect, one of the plurality of photoelectric devices under each of the plurality of lenses may be arranged such that an optical axis of the lens under which the photoelectric devices are positioned passes the one of the plurality of photoelectric devices.

According to a twelfth aspect, the present invention provides an imaging device including: a focus detection device according to the tenth aspect; and an image sensor that captures an image formed by the imaging optical system.

According to a thirteenth aspect, the present invention provides an imaging apparatus including: a light detection device including a lens array including a plurality of lenses arranged in the form of a honeycomb; and a photoelectric device array including a plurality of photoelectric devices for each of the plurality of lenses. The plurality of photoelectric devices is arranged under each of the plurality of lenses, and one of the plurality of photoelectric devices under each of the plurality of lenses is arranged such that an optical axis of the lens under which the photoelectric devices are positioned passes the one of the plurality of photoelectric devices. The imaging apparatus also includes an image generation unit that generates an image based on a signal obtained by a photoelectric device arranged such that an optical axis of each lens in the lens array passes the photoelectric device.

According to a fourteenth aspect, the imaging apparatus according to the thirteenth aspect may further include: an image sensor that captures an image formed by an imaging optical system.

According to a fifteenth aspect, the imaging apparatus according to the thirteenth aspect may further include: a focus adjustment state detection unit that selects a plurality of lenses from the lens array based on contrast of the image, generated by the image generation unit and detects a focus adjustment state of the imaging optical system based on the signals obtained from photoelectric devices corresponding to the plurality of selected lenses.

According to a sixteenth aspect, the present invention provides a method of producing a light detection device, including: arranging a plurality of lenses in the form of a honeycomb to provide a lens array; and providing a photoelectric device array including a plurality of photoelectric devices for each of the plurality of lenses.

According to a seventeenth aspect, in the method of producing a light detection device according to the sixteenth aspect, the photoelectric device array may be formed by arranging the plurality of photoelectric devices in the form of a honeycomb.

According to an eighteenth aspect, in the method of producing a light detection device according to the sixteenth aspect, each of the plurality of lenses may be in the form of an orthohexagon.

According to a nineteenth aspect, in the method of producing a light detection device according to the seventeenth aspect, the lenses in the lens array and the photoelectric devices in the photoelectric device array may be each made in the form of an orthohexagon.

According to a twentieth aspect, in the method of producing a light detection device according to the nineteenth aspect, a length of a longest diagonal line segment of each of the plurality of lenses may be made an integral multiple of a length of a longest diagonal line segment of each of the plurality of photoelectric devices.

According to a twenty first aspect, in the method of producing a light detection device according to the nineteenth aspect, a length of a longest diagonal line segment of each of the plurality of lenses may be made an integral multiple of a distance between a pair of opposite sides of each of the plurality of photoelectric devices.

According to a twenty second aspect, in the method of producing a light detection device according to the sixteenth aspect, the photoelectric device array may be located such that one of the plurality of photoelectric devices is set at a position corresponding to an optical axis of the lens.

According to a twenty third aspect, the present invention provides a method of detecting a focus including: providing a light detection device according to the first aspect; receiving light by the photoelectric device array through an imaging optical system; and acquiring a focus adjustment state of the imaging optical system based on an output from the photoelectric devices.

According to a twenty fourth aspect, the method of detecting a focus according to the twenty third aspect may further include: selecting, for each of the plurality of lenses, a pair of photoelectric devices arranged along a line passing centers of the plurality of lenses from the plurality of photoelectric devices corresponding to each of the plurality of lenses; and acquiring a focus adjustment state based on signals obtained by the pair of selected photoelectric devices.

According to a twenty fifth aspect, the method of detecting a focus according to the twenty third aspect may further include: detecting a contrast of an image based on the output obtained by the photoelectric device; selecting a plurality of lenses from the lens array based on the contrast; and acquiring a focus adjustment state of the imaging optical system based on outputs obtained in the photoelectric devise corresponding to the plurality of selected lenses.

According to the present invention, the density of lenses and photoelectric devices in their arrangement can be increased, so that occurrence of optically invalid area in the predetermined focal plane can be minimized.

BRIEF DESCRIPTION OF THE DRAWINGS

FIG. 9 is a schematic plan view showing a modification of the shape of the microlens;

FIG. 10B is a table showing examples of a ratio (d2/d1) of the horizontal distance d2 to the vertical d1 distance between two adjacent usable hexagons and a central angle of one side of each hexagon.

DETAILED DESCRIPTION OF THE INVENTION

Figure 1:
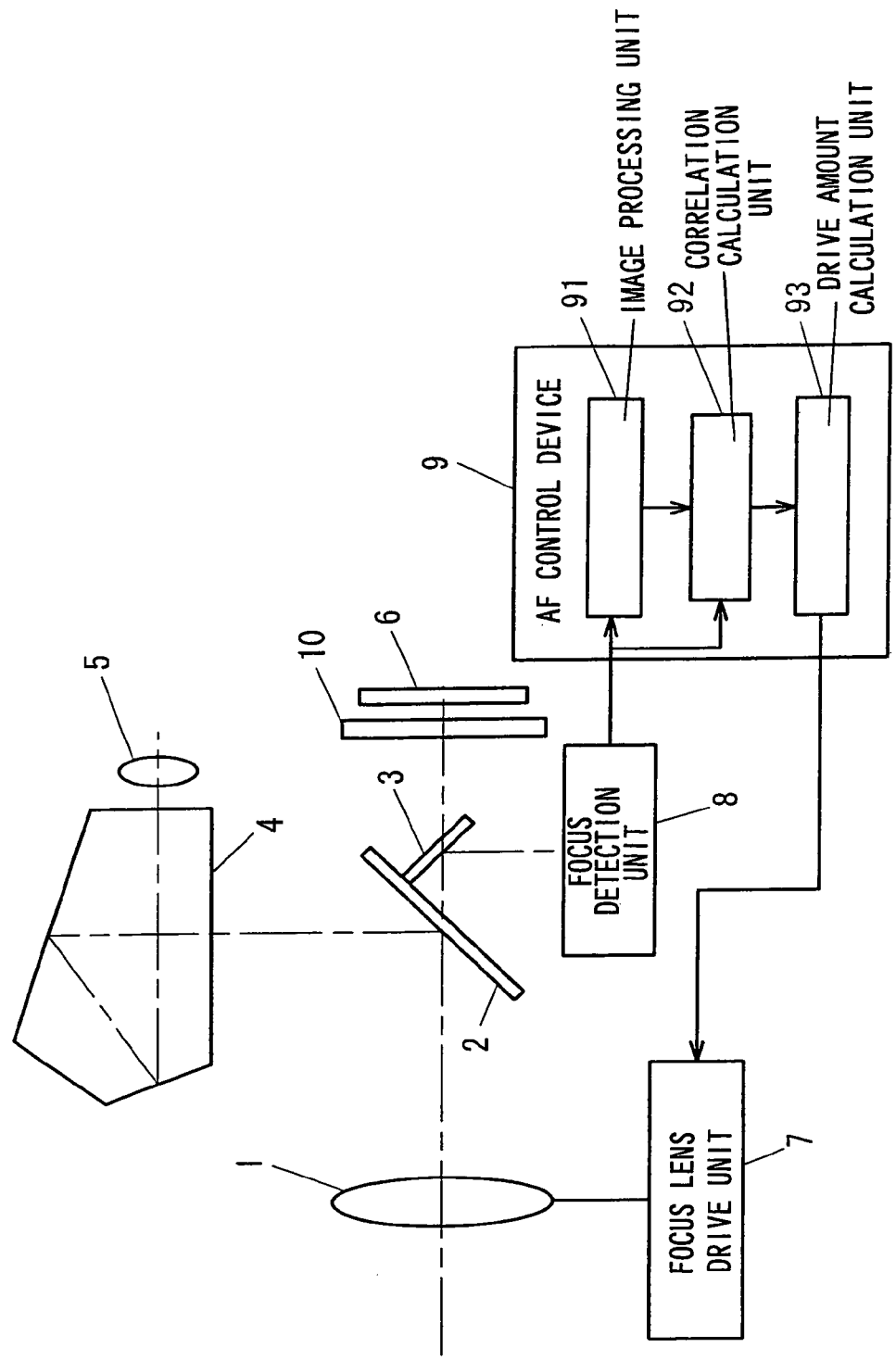
FIG. 1 is a schematic block diagram illustrating an imaging device according to an embodiment of the present invention.

Hereinafter, an embodiment of the present invention is explained with reference to the attached drawings. FIG. 1 is a schematic block diagram illustrating an imaging apparatus according to an embodiment of the present invention and shows a construction of essential part of a digital camera. Note that illustration and description on general devices and apparatus of the camera other than the devices and apparatus relating to the focus detection device and imaging device according to the present invention have been omitted. The camera shown in FIG. 1 includes a photographic lens 1, a main mirror 2, a submirror 3, a pentaprism 4, an eyepiece 5, an image sensor 6, a focus lens drive unit 7, a focus detection device 8, an AF control device and so on.

When photography is not performed or the camera is in a non-photographic mode, the main mirror 2 and the submirror 3 are placed in a photographic light path. A portion of light from a subject that has transmitted through the photographic lens 1 is guided to the eye of a photographer through the main mirror 2, the pentaprism 4, and the eyepiece 5, and an image of the subject is viewed by the photographer. The remaining portion of the light from the subject is guided to a focus detection device 8 through the main mirror 2 and the submirror 3. The focus detection device 8 detects the state of focus adjustment of the photographic lens 1 and outputs the result of detection to the AF control device 9. Details of the focus detection device 8 are described later on.

On the other hand, when photography is performed or the camera is in a photographic mode, the main mirror 2 and the submirror 3 are retracted from the light path, a shutter 10 is opened/closed, and the image of the subject formed through the photographic lens 1 is projected on the imaging plane of the image sensor 6. The image sensor 6, which is constituted by a solid state image sensor such as a CCD (charge coupled device) or a CMOS (complementary metal-oxide semiconductor), converts the image of the subject formed through the photographic lens 1 to an electric signal.

The AF (autofocusing) control device 9 includes, for example, a microcomputer, a ROM (read only memory), a RAM (random access memory), and an A/D (analog/digital) converter and also includes an image processing unit 91, a correlation calculation unit 92, and a drive amount calculation unit 93. The image processing unit 91 generates an image based on a signal from the focus detection device 8, and calculates a focus detection area from contrast information of the generated image. The correlation calculation unit 92 performs the correlation calculation detailed later on based on the signal from the focus detection device 8 and the information on focus detection area calculated by the image processing unit 91 to calculate a focus adjustment state (defocus amount) of the photographic lens 1 based on the result of the correlation calculation.

The drive amount calculation unit 93 calculates a target position of lens that serves as an eyemark when driving a focus lens (not shown) of the photographic lens 1 based on the calculated defocus amount. The calculated target position of lens is input in the focus lens drive unit 7, which then drives the focus lens to the target position based on the input target position. Note that the term "target position of lens" means a position of lens at which the defocus amount is substantially zero (0) when the focus lens is driven to that position.

Figure 2:
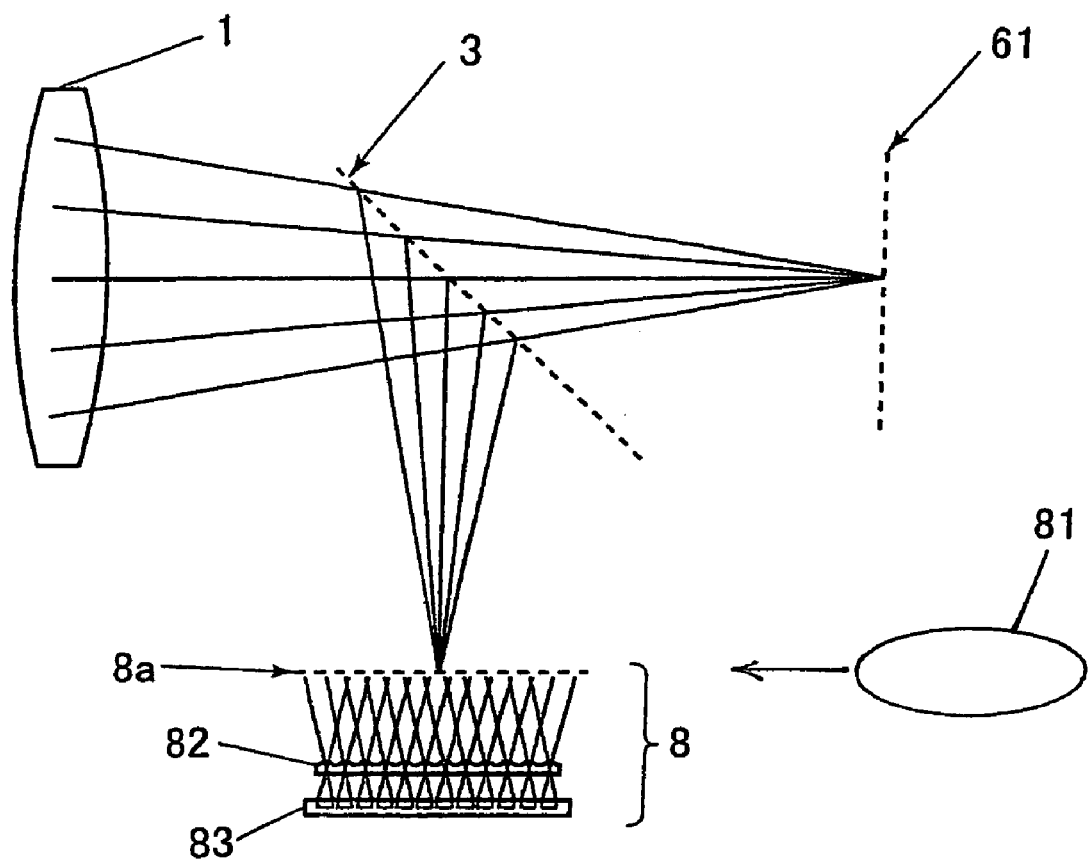
FIG. 2 is a schematic diagram illustrating the configuration of a focus detection optical system according to an embodiment of the present invention.

FIG. 2 is a schematic diagram illustrating a configuration of a focus detection optical system. The light from the subject that has transmitted through the photographic lens 1 forms an image on an imaging plane 61 of the image sensor 6. Further, the light from the subject that has transmitted through the photographic lens 1 is reflected by the submirror 3 to form an image of the subject on a predetermined imaging plane 8*a* of the photographic lens 1. In the vicinity of the predetermined imaging plane 8*a* or at a position optically equivalent to the imaging plane 61, there is arranged a field lens 81 to allow for detection of a light flux at this position by the focus detection device 8.

The focus detection device 8 is provided with a microlens array 82 and a photoelectric device array 83 along the optical axis thereof. The microlens array 82 includes a plurality of microlenses arranged two-dimensionally. The photoelectric device array 83, which includes a plurality of photoelectric devices that are two-dimensionally arranged, is arranged substantially at a focal position of the microlens array 82.

Note that the microlens array 82 may be arranged at a position somewhat shifted from the predetermined imaging plane 8*a* or so as to match the predetermined imaging plane 8*a*. When the microlens array 82 is arranged so as to match the predetermined imaging plane 8*a*, if the microlenses provide images of the subject with different contrasts in a portion of the microlens array 82, that portion becomes an insensitive region. However, when the microlens array 82 is arranged as shifted from the predetermined imaging plane 8*a*, such a disadvantage can be avoided.

Figure 3:
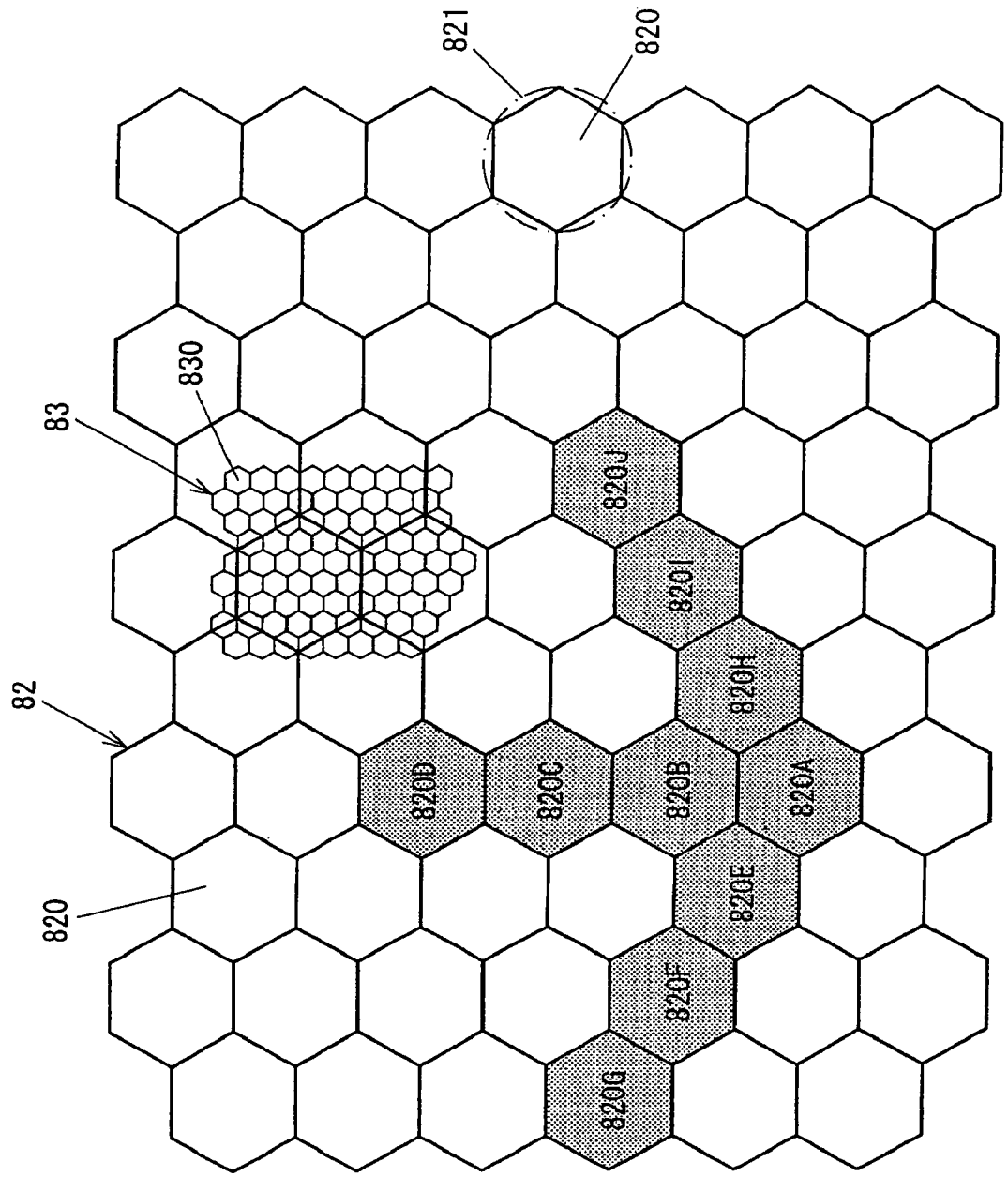
FIG. 3 is a schematic plan view illustrating a part of a microlens array and a part of a photoelectric device array used in the light detection device according to an embodiment of the present invention.

FIG. 3 is a schematic plan view illustrating a part of the microlens array 82 and a part of the photoelectric device array 83. FIG. 3 provides a view of the microlens array 82 and the photoelectric device 83 as seen from the side of the half mirror 3. That is, the photoelectric device array 83 is behind the microlens array 82. The microlens array 82 includes a plurality of regular hexagonal (orthohexagonal) microlenses 820 arranged in the form of a honeycomb. Note that the directions of top and bottom and of right and left in FIG. 3 coincide with the directions of top and bottom and of right and left of the imaging plane on which an image to be captured by the image sensor 6 is formed.

The shape of the lens surface of each microlens 820 is substantially the same as that of a circular microlens 821 indicated by a dashed-dotted line cut into an orthohexagon and has substantially the same function as that of the circular microlens 821. In this manner, when the orthohexagonal microlenses 820 are arranged in the form of a honeycomb, there occur no gaps between the microlenses that will become insensitive regions upon focus detection unlike the case where the circular microlenses 821 are arranged similarly.

Each photoelectric device 830 is in the form of an orthohexagon similarly to the microlens 820 and the photoelectric devices 830 are arranged so as to form a honeycomb structure. The size of the photoelectric device is set smaller than that of the microlens 820 and an area which is a vertical projection of the microlens 820 includes a plurality of photoelectric devices 830. The plurality of photoelectric devices 830 are provided so as to correspond to one of the microlenses 820. Hereinafter, such photoelectric devices 830 are called a plurality of photoelectric devices encompassed by the microlens 820.

In the TCL-type focus detection device, a plurality of microlenses 820A, 820B, 820C and 820D arranged in one direction is selected as shown in FIG. 3 and focus detection is performed based on the outputs of the photoelectric devices 830 encompassed by these microlenses 820. In this case, a pair of photoelectric devices or a pair of photoelectric device groups are selected from the plurality of photoelectric devices 830 encompassed by the microlenses 820 and focus detection is performed based on the outputs thereof. For this reason, if the number of the photoelectric devices 830 encompassed by the microlenses 820 is relatively small, the degree of freedom in selection of the photoelectric devices 830 upon focus detection is decreased and on the other hand, the space frequency upon focus detection is increased, so that the focus detection optical system of the present invention can cope with finer images of the subject.

Figure 4:
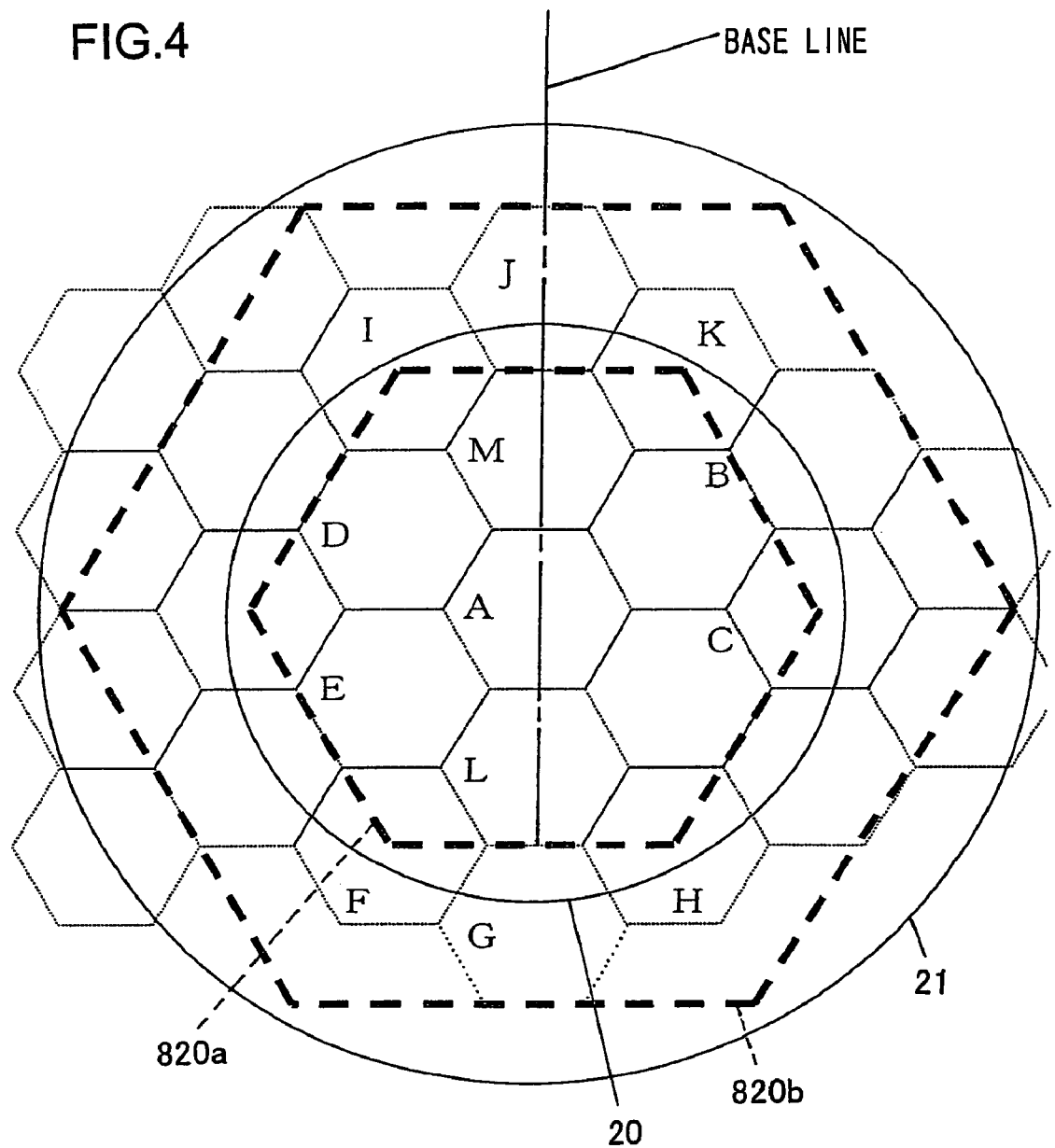
FIG. 4 is an enlarged schematic plan view of the photoelectric device array in FIG. 3.

FIG. 4 is an enlarged schematic plan view of the photoelectric device array 83. Broken lines 820*a* and 820*b* indicate two types of microlenses having different sizes. The photoelectric devices 830 are arranged such that the direction of one of the longest diagonal line segments of each orthohexagon coincides with the direction of right and left in FIG. 4. Similarly, the microlenses 820*a* and 820*b* are arranged such that one of the longest diagonal line segments of each of the microlenses 820*a* and 820*b* coincides with the direction of right and left in FIG. 4. Herein, by the term "diagonal direction of an orthohexagon" is meant a direction of one of the longest diagonal line segments of the hexagon or a direction parallel thereto. An orthohexagon has three longest diagonal line segments with one of them intersecting the others at an angle of 60° or 120°. Accordingly, when a predetermined direction corresponds to a diagonal direction of an orthohexagon, one of the three longest diagonal line segments of the orthohexagon corresponds to the predetermined direction. In addition, when the predetermined direction intersects one of the three longest diagonal line segments at an angle of 60° or 120°, the direction along one of the three diagonal line segments always corresponds to the predetermined direction. Note that similarly, a diagonal direction can be conceived for a hexagon that is not exactly an orthohexagon but resembles it.

Figure 5:
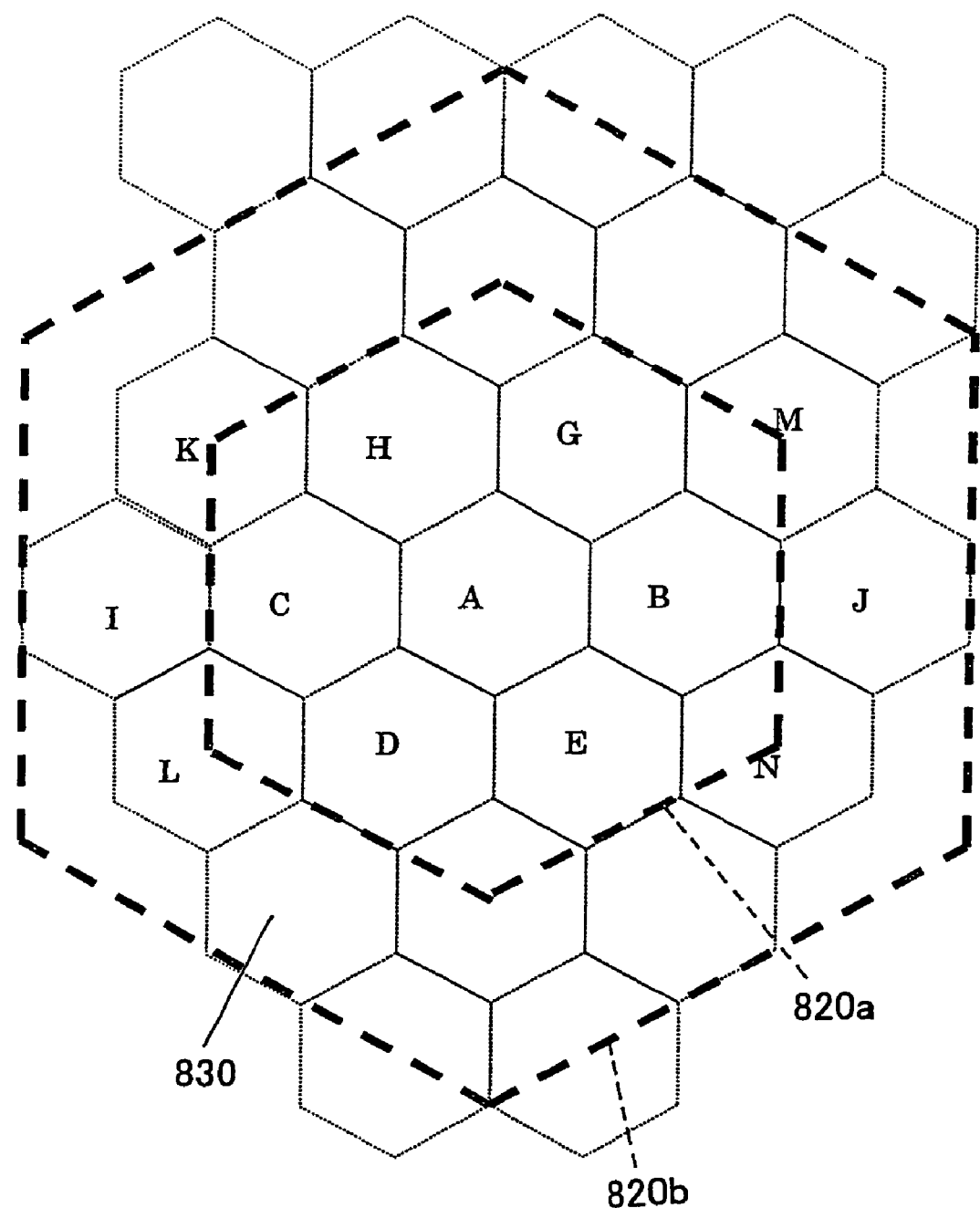
FIG. 5 is a schematic plan view of the microlenses and the photoelectric device arranged such that one of the longest diagonal line segments of each orthohexagon is parallel to the direction of top and bottom of the imaging screen.

The orthohexagonal microlens 820*a* has opposite sides at a distance which is 3 times as great as the distance between opposite sides of the orthohexagonal photoelectric device 830. The area of the orthohexagonal microlens 820*a* is 9 times as great as the area of the orthohexagonal photoelectric device 830. On the other hand, the orthohexagonal microlens 820*b* has opposite sides at a distance which is 5 times as great as the distance between opposite sides of the orthohexagonal photoelectric device 830. The area of the orthohexagonal microlens 820*b* is 25 times as great as the area of the orthohexagonal photoelectric device 830. In each case, the microlens array 82 and the photoelectric device array 83 are positioned relative to each other such that one of the photoelectric devices 830 is located on a common optical axis (vertical to paper surface of FIG. 4) of the microlenses 820*a* and 820*b* (in other words, the common optical axis of the microlenses 820*a* and 820*b* passes one of the photoelectric devices 830). In this case, the number of the photoelectric devices 830 completely encompassed by a projected area of the microlens 820*a* is seven (7) whereas the number of the photoelectric devices 830 completely encompassed by a projected area of the microlens 820*b* is nineteen (19). FIG. 5 illustrates the case in which the microlenses 820*a* and 820 as well as the photoelectric devices 830 are arranged such that one of the largest diagonal segments of each orthohexagon coincides with the direction of top and bottom in FIG. 5.

As mentioned above, each of the photoelectric devices 830 is provided substantially in the focal plane of each microlens 820 and the focal length of the microlens 820 is smaller than the focal length of the photographic lens 1. From this, it can be deemed that each photoelectric device 830 is substantially at an optically conjugate position with the pupil plane of the photographic lens 1. That is, it can be said that the outputs of the photoelectric devices 830 under or covered by each microlens 820 represent each an intensity of a light flux that passes through a portion of the pupil of the photographic lens 1. A circle 20 in FIG. 4 is an aperture pupil of the photographic lens 1 corresponding to the microlens 820*a* and a larger circle 21 indicates an aperture pupil of the larger microlens 820*b*.

Explanation on Focus Detection Calculation

Next, explanation is made on focus detection calculation based on the detection data from the focus detection device 8. In this case, based on the signals from the photoelectric devices 830 under the microlens 820 arranged in one direction, such as the microlenses 820A to 820D, the following correlation calculation is performed in a correlation calculation unit 92 in the AF control device shown in FIG. 1. On this occasion, signals of a pair of photoelectric devices 830 corresponding to the aperture pupil from among the photoelectric devices 830 under each microlens 820 are used.

For the microlens 820A to 820D, there are used signals from a pair of photoelectric devices 830 or a pair of photoelectric device groups (a set of photoelectric devices 830) that are arranged along a base line, which connects optical axes of the microlenses 820A to 820D, and in a symmetry with respect to the respective optical axes of the microlenses 820A to 820D. The signals are named "$a_j$" and "$b_j$" where "j" is a natural number such that j=1, 2, ..., N, with N being the number of microlenses. In this embodiment, the focus detection is performed using light fluxes that pass through the microlenses 820A to 820D and hence N=4. The symbol "$a_j$" represents a signal or signals from the photoelectric device or the photoelectric device group on one side of the base line connecting the optical axes of the microlenses 820 and "$b_j$" represents a signal or signals from the photoelectric device or the photoelectric device group on the other side of the base line.

Figure 6:
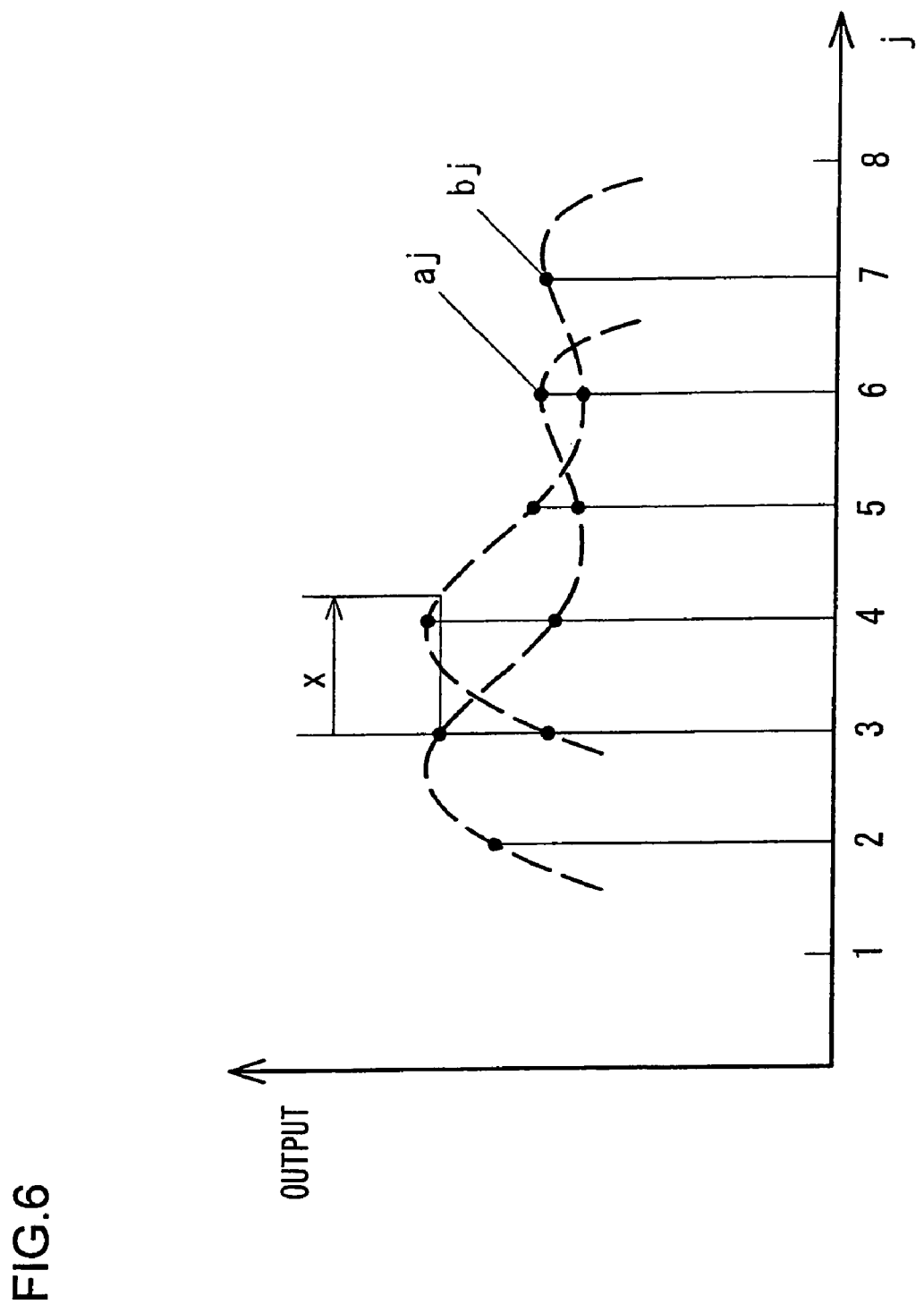
FIG. 6 is a graph showing an example of the output pattern of a pair of signals from a pair of photoelectric device groups.

FIG. 6 illustrates an example of each output pattern of signals $a_j$ and $b_j$. The output of the signal $a_j$ and the output of the signal $b_j$ are of substantially the same pattern. FIG. 6 shows signals $a_j$ and $b_j$ in a non-focused state. The output pattern of the signal $a_j$ and the output pattern of the signal $b_j$ are shifted from each other by a distance x in the direction of right and left. On the other hand, in a focused state, the distance x is zero (x=0). In this manner, a shift of the output patterns from the focused state is known from the shift amount x of the output pattern. Accordingly, the state of focusing of the photographic lens can be adjusted by adjusting the shift amount x such that the shift amount x becomes zero (X=0). To be concrete, this can be achieved by obtaining a value of "k" that minimizes a value $D_k$ of correlation calculation expressed by the following equation (1):

$$D_k = \sum_i |a_i + k - b_i| \quad (1)$$

Since $D_k$ expressed by the equation (1) is a discrete value, the minimum value of it can be deemed to be in the vicinity of a true minimum value. For this reason, the shift amount x is calculated by interpolating $D_k$ values around the minimum $D_k$ into the equation (1). When spatial variations of signals $a_j$ and $b_j$ are expressed by sinusoidal variations, D(X) as a continuous function is an absolute value of a sinusoidal wave and hence the position at which D(X) is minimal can be obtained by a simple linear approximation based on the discrete $D_k$ values.

Figure 7:
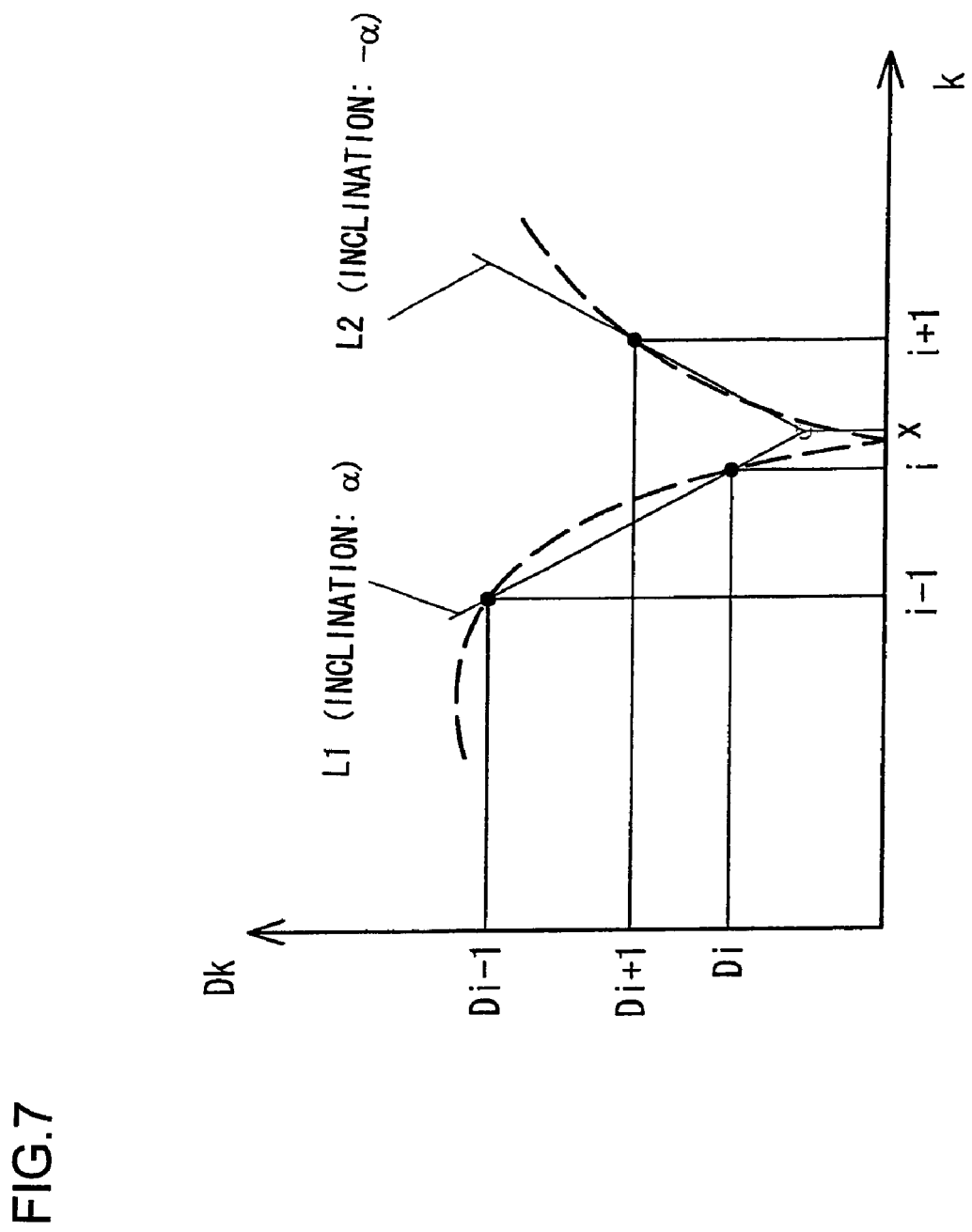
FIG. 7 is a graph illustrating the calculation of shift amount "x"

As shown in FIG. 7, it is assumed that the minimum $D_k$ is $D_i$ and adjacent $D_k$'s are $D_{i+1}$ and $D_{i-1}$. Then, a larger one of $D_{i+1}$ and $D_{i-1}$ is selected. In the example shown in FIG. 7, $D_{i-1}$ is greater than $D_{i+1}$, and hence $D_{i-1}$ is selected. Then, it is assumed that a line connecting the selected $D_{i-1}$ with $D_{i+1}$ is L1. Also, it is assumed that the inclination of the line L1 is α and that a line that has an inclination of −α and passes through $D_{i+1}$ is L2. Then, a point at the intersection of the line L1 with the line L2 is obtained. The value x of this intersection point provides the above-mentioned shift amount. The drive amount calculation unit 93 in FIG. 1 calculates the drive amount of the focus lens based on the shift amount x calculated by the correlation calculation unit 92. This drive amount is a lens drive amount from the current position of the lens to the position of the lens at which the shift amount x is zero.

Incidentally, since the microlenses 820A to 820D encompass a plurality of photoelectric devices 830 as shown in FIG. 4, there is a plurality of ways in selecting the pair of photoelectric devices 830 or a pair of photoelectric device groups along the base line. When the microlens has a size indicated by reference numeral 820*a*, for example, a progression $a_j$ is formed from signals from the photoelectric device L arranged below the optical axis and a progression $b_j$ is formed from signals from the photoelectric device M arranged above the optical axis.

Selection of signals for forming progressions $a_j$ and $b_j$ is not limited to what is mentioned above but may be performed in various manners. For example, when i-sets of signals, i.e., $a_1$ to $a_i$ and $b_1$ to $b_i$ are to be selected, $a_1$ to $a_i$ may be selected from one of a pair of photoelectric devices and $b_1$ to $b_i$ may be selected from the other of the pair of the photoelectric devices. Alternatively, $a_1, b_1; a_2, b_2; \ldots; a_i, b_i$ may be selected in sequence from predetermined first to i-th photoelectric devices.

Further, in order to improve S/N ratio, a plurality of photoelectric devices may be used. For example, instead of the photoelectric device L, a photoelectric device group (C+L+E) consisting of photoelectric devices C, L, and E may be used and instead of the photoelectric device M, a photoelectric device group (B+M+D) consisting of the photoelectric devices B, M, and D may be used. Further, in order to be symmetrical with respect to the optical axis, there may be selected photoelectric device groups (E+C) and (B+D) or photoelectric device groups (A+C+L+E) and (A+B+M+D). Also, for the larger microlens 820b, the photoelectric device groups (L+F+G+H) and (M+I+J+K) may be selected. As mentioned above, when focus detection is performed using a plurality of photoelectric devices, there may be used a signal obtained by adding output signals from a plurality of photoelectric devices for each microlens.

When the microlenses 820 are arranged in the form of a honeycomb as shown in FIG. 3, the directions in which the selected microlenses 820 are arranged can be set not only to the above-mentioned vertical direction but also to the direction at an angle of 60° from the horizontal direction such as the microlenses 820A, 820H, 820I, and 820J and to the direction at an angle of 120° from the horizontal direction such as the microlenses 820A, 820E, 820F, and 820G. When the direction of the arrangement of the microlenses is set at an angle of 60° from the horizontal direction, the photoelectric devices E and B correspond to the photoelectric devices L and M, respectively. On the other hand, when the direction of the arrangement of the microlenses is set at an angle of 120° from the horizontal direction, the photoelectric devices C and D are selected. In this manner, by arranging the microlenses 820 in the form of a honeycomb, focus detection can be performed in three directions.

Figure 8:
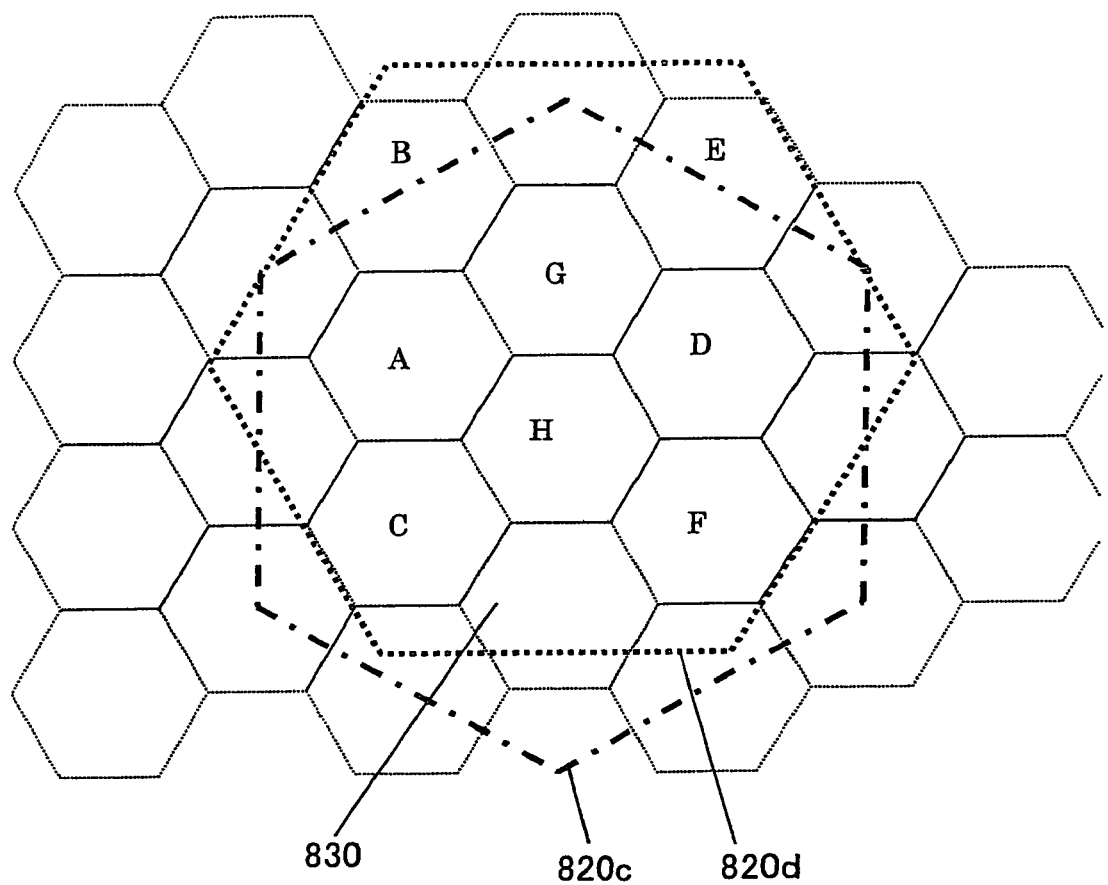
FIG. 8 is a schematic plan view illustrating another example of arrangement of the photoelectric device and the microlenses.

In the relationship between the arrangement of the microlenses 820 and that of the photoelectric devices 830 shown in FIGS. 4 and 5, the directions of the diagonal line coincide with each other. On the other hand, in the case of the microlens 820c indicated by dashed-dotted line in FIG. 8, the direction of one of the longest diagonal line segments of the orthohexagon is perpendicular to the direction of one of the longest diagonal line segments of each photoelectric device 830. When the direction of the base line of the microlens 820 is taken as horizontal direction, the above-mentioned correlation calculation can be performed by using signals from a pair of photoelectric device groups (A+C) and (D+F). Further, when the microlens 820d is arranged as indicated by dotted line, the center of the photoelectric device 830 is not positioned on the optical axis of the microlens 820. Accordingly, eight (8) photoelectric devices A to H are used in order to perform focus detection. For example, focus detection is performed by having the right and left pupils represented by a pair of photoelectric device groups (A+C) and (D+F), respectively. As mentioned above, a signal obtained by adding output signals from the pair of photoelectric devices may be used for each microlens.

FIG. 9 is a schematic plan view showing a modification of the shape of the microlens 820. When each microlens 820 is an orthohexagon as shown in FIG. 3, there occur photoelectric devices that are arranged as extending above two adjacent microlenses 820. Accordingly, in the modification shown in FIG. 9, the shape of the microlens is set such that the boundary between the photoelectric device and the microlens 820 coincides with the boundary of the photoelectric device itself. In this case too, the shape of the microlens surface is similar to the shape of the circular microlens 821 and one photoelectric device 830 is arranged so as to be passed by the optical axis of the microlens 821. Thus, the shapes of the microlens 820 and of the photoelectric devices 830 do not have to be orthohexagonal and any shape that allows the microlenses and the photoelectric devices to be arranged in the form of a honeycomb can be adopted.

Figure 10A:
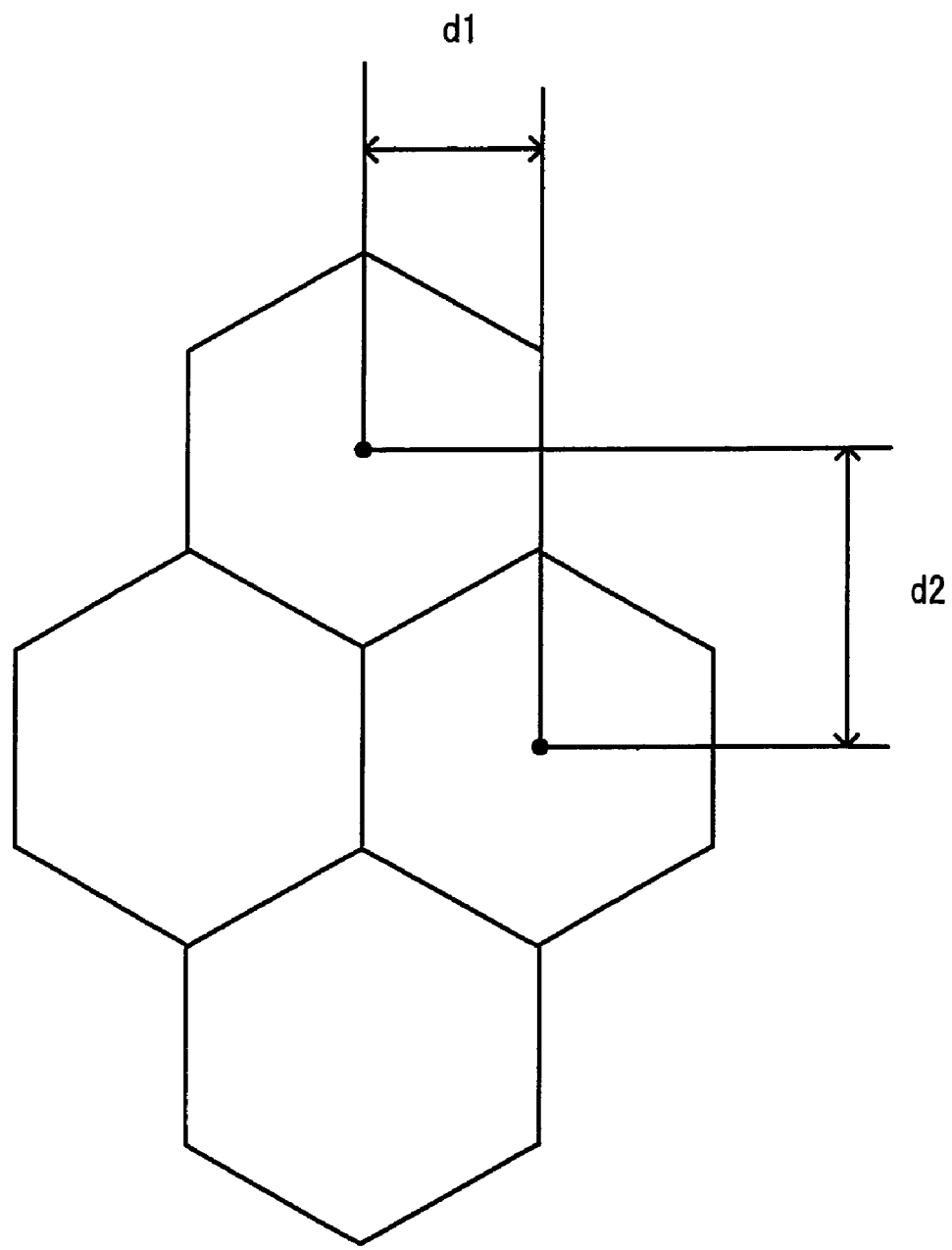
FIG. 10A is a diagram illustrating a relationship between a horizontal distance d1 and a vertical distance d2 between central points of two adjacent hexagons in the microlens array or the photoelectric device array according to a variation of the present invention.

FIG. 10A is a schematic diagram illustrating relationships between a horizontal distance d1 and a vertical distance d2 between central points of two adjacent hexagons in the microlens array or photoelectric device array. In the case of orthohexagons, the ratio of d2 to d1 (d2/d1) is $1/\sqrt{3}$ (ca. 1/1.73205) and a central angle against one side is 60°. This arrangement is preferred. However, for practical purposes, the hexagon does not have to be an orthohexagon, and d1 and d2 may be integers such that d2/d1 is approximately $1/\sqrt{3}$. FIG. 10B is a table showing examples of a ratio (d2/d1) of horizontal distance d1 and a vertical d2 distance between two adjacent usable hexagons and central angle of one side of the hexagon. In the table, to avoid redundancy or for convenience's sake, multiple number families or homologous hexagons are omitted (not shown) although such are usable too. For example, a hexagon of which d1 is 6 and d2 is 10 gives a d2/d1 value of 1.67, which is the same as the d2/d1 value (1.67) of the hexagon having a size of d1=3 and d2=5. Also the central angle is the same between these hexagons. These are homologous hexagons. The table indicates that the number of photoelectric devices arranged in the horizontal direction and that of photoelectric devices arranged in the vertical direction under or encompassed by a single microlens can be selected from a plurality of pairs of integers over a range of d2/d1 of from about 1.67 to about 1.80. Also, the table indicates that the central angle against one side of the usable hexagon is in the range of about 56.5° to about 64.1°. This arrangement enables photoelectric devices to distribute in a plane without gaps therebetween and also facilitates fabrication of the arrays. Further, with the above-mentioned arrangement, the light detection device of the present invention can be configured to enable selection of different pixels depending on the maximum value of aperture F of interchangeable lens to be used. For example, it is configured such that when the F value is large (e.g., F=21), the number of pixels is 19, and when the F value is small (e.g., F=20), the number of pixels is 9.

Further, a unit figure constituting the microlens array or the photoelectric device array may be a circle or a tetragon. The unit figure may also be one of those hexagons that approximate orthohexagons as shown in the table in FIG. 10B.

The above-mentioned honeycomb structures of the microlens and of the photoelectric device can be produced as follows. A thin film or a sheet that has a honeycomb structure can be prepared by various methods. For example, the honeycomb structure can be obtained by preparing a solution of a water-insoluble polymer in a water-incompatible organic solvent, coating the obtained polymer solution on a substrate, forming condensed water droplets on the surface of the obtained polymer solution by cooling in a humid atmosphere, and evaporating the organic solvent and the water droplets (see, e.g., Japanese Patent Laid-open Application No. 2007-112856).

Alternatively, the honeycomb structure can be obtained by a so-called two-draw process (see, for example, Michael Lampton, "The Microchannel Image Intensifier", Scientific American, November 1981, pp. 46-55). First, a cylindrical tube of glass is fitted with a core made of a glass that can later be etched away in acid, and the tube is heated and drawn to a predetermined thickness of, for example, about a millimeter in an electric oven. Several thousand predetermined (for example, 15-cm) lengths of drawn tubing are assembled into a hexagonal bundle of a predetermined size (for example, about 50-mm across). The bundle is heated and drawn again to obtain a fiber of a predetermined thickness (for example, about 1-mm in diameter) having a hexagonal cross-section, which is cut in the same manner as mentioned above. A bundle of the resultant hexagonal fibers is fused together and sliced to form wafers of a predetermined thickness (for example, about 1-mm thick). The wafers are etched in acid to remove the glass cores.

Then, the thin film or wafer prepared by any one of the above-mentioned methods is used as a template for preparing a mold for producing a microlens array or a photoelectric device array in which the microlenses or the photoelectric devices, respectively, are arranged in the form of a honeycomb. The mold thus obtained is used for producing a honeycomb microlens array or a honeycomb photoelectric device array to be used in the present invention by a process known in the art.

In the above-mentioned embodiment, the example in which both the microlens array and the photoelectric device array have honeycomb structures, respectively. However, the photoelectric device array need not have a honeycomb structure. Note that when both the microlens array and the photoelectric device array have honeycomb structures, respectively, further efficiency can be obtained in utilization of light and production of the light detection device, focus detection device and imaging apparatus of the present invention.

Explanation on Image Processing Unit

The microlenses 820A to 820D used for the focus detection as shown in FIG. 3 may be set in a plurality of regions in the photographic plane in advance. For example, areas for autofocusing may be decided in advance or areas with high contrasts may be set as areas for autofocusing. Alternatively, the microlenses 820A to 820D may be set based on image information as detailed hereinbelow. The image processing unit 91 shown in FIG. 1 reads out from the focus detection unit 8 signals of the photoelectric devices 830 located on the optical axis of each microlens 820 from among a plurality of the photoelectric devices 830 included by the photoelectric device array 83 and generates an image based on these signals. In this case, since the light flux in the vicinity of the optical axis of each microlens 820 is used, a pan-focused image can be obtained, so that it is possible to recognize an area having high contrast from contrast information obtained from the image.

Accordingly, in the image processing unit 91, contrast information on the overall area of the imaging plane is acquired by a conventional contrast calculation method to extract a high contrast area. Then, the image processing unit 91 determines the arrangement of the microlenses 820 that is optimal for the focus detection of a high contrast area, that is, a focus detection area. For example, in the case of the microlens array 82 shown in FIG. 3, the direction of arrangement of microlenses is selected from any desired one of vertical arrangement, 60° arrangement, and 120° arrangement as defined above, and the number of microlenses 820 is selected depending on the size of the high contrast area. When the microlenses 820 to be used for the focus detection are decided, the correlation calculation unit 92 performs the above-mentioned correlation calculation based on the signals from the photoelectric devices 830 under each of the decided microlens 820.

As mentioned above, in the present embodiment, the microlenses 820 in the microlens array 82 are arranged in the form of a honeycomb so as to be laid down on the optically effective area without gaps and area sensors each having arranged therein the photoelectric devices 830 in the form of a honeycomb are arranged corresponding to the respective microlenses 820. Accordingly, an optically ineffective area is decreased, so that the occurrence of insensitive zone can be prevented. Further, since the density of information per unit area is increased, precision of focus detection can be improved.

In the above-mentioned embodiment, the present invention is applied to the focus detection device 8 provided separately from the image sensor 6 to be used for image-capturing. However, the present invention may be similarly applied to a focus detection device having a construction in which a part of the imaging pixel array in the image sensor is replaced by TCL-type focus detection pixels. That is, the pixel array of the image sensor 6 is made as an array in the form of a honeycomb and a part of the pixels is replaced by the above-mentioned orthohexagonal microlenses 820 and the orthohexagonal photoelectric devices 830. Then, focus detection is performed based on signals from the orthohexagonal photoelectric devices 830. For example, when the lens of the imaging device is made of a honeycomb structure, a plurality of photoelectric devices may be provided only in areas used for autofocusing. Note that when image data are obtained, image data for the pixel used for the focus detection are obtained by interpolation using the image data of pixels near or surrounding the pixels used for the focus detection.

While in the above-mentioned embodiment, explanation has been made on the focus detection device in a digital still camera, the present invention may also be applied to focus detection of not only the digital still camera but also various types of imaging devices as well as light detection devices, for example, an aberration detection device and a variable focus camera. Further, the present invention is not limited to the above-mentioned embodiment so far as the feature of the present invention is not damaged.

What is claimed is:

1. A camera, comprising:
    an imaging optical system;
    a lens array including a plurality of lenses, being each in the form of an orthohexagon, arranged in the form of a honeycomb;
    a photoelectric device array including a plurality of photoelectric devices for each of the plurality of lenses, wherein
    the plurality of photoelectric devices is arranged substantially at a focal position of each of the plurality of lenses and at a position substantially optically conjugate with a pupil of the imaging optical system,
    a focus adjustment state detection unit that detects a focus adjustment state of the imaging optical system based on signals obtained from a pair of photoelectric devices among the plurality of photoelectric devices,
    the lens array is arranged such that sides of any adjacent orthohexagonal lenses, each of which has a first base line, a second base line, and a third base line that each connects centers of the plurality of lenses, contact each other, the plurality of photoelectric devices includes at least a first pair of photoelectric devices, a second pair of photoelectric devices, and a third pair of photoelectric devices, the first pair of photoelectric devices are located along the first base line, the second pair of photoelectric devices are located along the second base line, and the third pair of photoelectric devices are located along the third base line, and the focus adjustment state detection unit includes a processor that selects the first pair of photoelectric devices from among the plurality of photoelectric devices corresponding to each of the plurality of lenses, and detects the focus adjustment state in a first direction, selects the second pair of photoelectric devices from among the plurality of photoelectric devices corresponding to each of the plurality of lenses and detects the focus adjustment state in a second direction, and selects the third pair of photoelectric devices from among the plurality of photoelectric devices corresponding to each of the plurality of lenses and detects the focus adjustment state in a third direction.

2. The camera according to claim 1, wherein:

the plurality of photoelectric devices, being each in the form of an orthohexagon, is densely arranged substantially at a focal position of each of the plurality of lenses in the form of a honeycomb, and a distance between a pair of opposite sides of each of the plurality of lenses is an integral multiple of a distance between a pair of opposite sides of each of the plurality of photoelectric devices.

3. The camera according to claim 1, wherein:

one of the plurality of photoelectric devices for each of the plurality of lenses is arranged such that an optical axis of the lens passes the one of the plurality of photoelectric devices.

* * * * *